FIG. 1
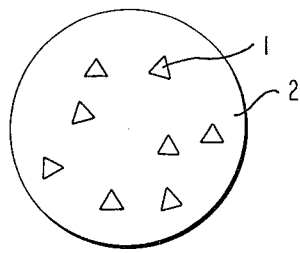
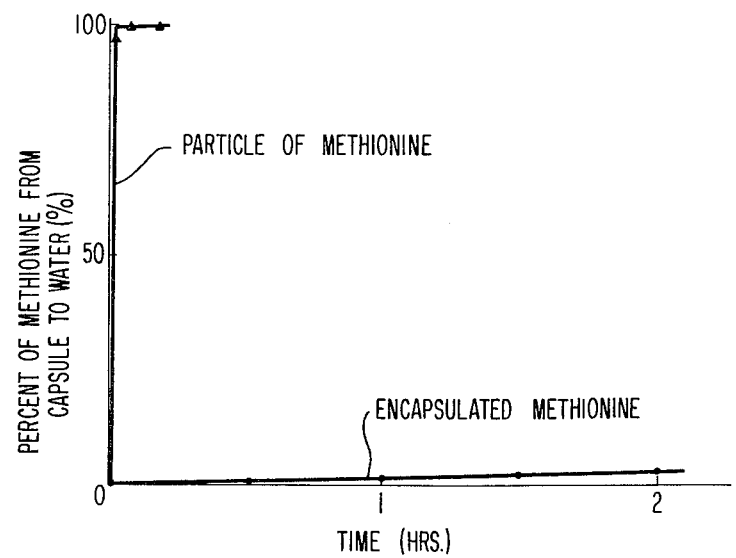
FIG. 2

United States Patent Office 3,804,776
Patented Apr. 16, 1974

3,804,776
METHOD OF PRODUCING OIL AND FAT ENCAPSULATED AMINO ACIDS
Kenichiro Yazawa, Fuminori Arai, Masao Kitajima, and Asaji Kondo, Asaka, Japan, assignors to Fuji Photo Film Co., Ltd., Kanagawa, Japan
Filed Dec. 14, 1971, Ser. No. 207,911
Claims priority, application Japan, Dec. 14, 1970, 45/111,581
Int. Cl. B01j 13/02; B44d 1/02
U.S. Cl. 252—316
5 Claims

ABSTRACT OF THE DISCLOSURE

Oil and fat encapsulated amino acids or polypeptides are prepared by dispersing such compound in a molten mixture of oils and fats, some of which have a melting point greater than 40° C. and some of which have a melting point less than 40° C., the mixture thereafter being poured into water which is at the temperature of from 20–40° C.

BACKGROUND OF THE INVENTION

Field of the invention

This invention relates to a method of encapsulating an amino acid with oils and fats. More particularly, this invention relates to a method of directly producing oil and fat capsules containing an amino acid having a granular size of from 5 microns to 5 mm. by dispersing an amino acid in oils and fats being constituted of oils and fats having a melting point higher and, if necessary, lower than 40° C., and pouring the molten dispersion into water.

Description of the prior art

A method of producing capsules by the use of oils and fats as encapsulating agents therefor has been described in Japanese patent publication 5,911/1964 and British Pat. 1,079,767. However, in the procedure of the Japanese patent publication, it is necessary to use a medium of high cost, such as silicon, and therefore this procedure is not economical, while in the procedure of British Pat. 1,079,- 767 the production of the capsules is conducted in the vapor phase, thus necessitating large scale cooling apparatus. Also difficulties are encountered in controlling the granular size of the capsules, and therefore it is difficult to produce capsules having a granular size of less than 5 mm.

SUMMARY OF THE INVENTION

The advantages of the method of the present invention are that water is only employed as the reaction medium, complicated apparatus is unnecessary and continuous operation is possible.

The general method of the present invention for producing oil and fat capsules containing an amino acid or acids is as follows: a powdered amino acid is dispersed in a molten oil and fat having higher melting point than 40° C. and, if necessary, those having lower melting point than 40° C.; the molten dispersion thus prepared is then poured into or added dropwise to warm water through a thin nozzle so that the oils and fats are solidified, on cooling, around the core of the amino acid so as to give globular capsules. The capsules comprise oils and fats as an encapsulating agent, thus enabling the amino acid in the capsules to be protected from the outer environment, such as water, acids, alkalis and various enzymes, barring oil and fat decomposing enzymes. The contents of the capsules are released by the action of heat or oil and fat decomposing enzymes.

DETAILED DESCRIPTION OF THE INVENTION

As known in the art, oil and fat are general definition of a substance composed of triglyceride as main component, which is triglyceryl ester of fatty acid and glycerine. Thus defined oil and fat are classified into liquid and solid at normal temperature. That is, what is liquid at a temperature lower than 40° C. is oil, and what is solid at 40° C. or higher temperature is fat. In the present invention, the above definition is employed.

The feature of the invention is to use the fat as a substance for encapsulating an amino acid, in order to produce stronger amino acid-containing capsules.

Oils and fats having a higher melting point, that is the fats, which are employed in the present invention may be any animal, plant or mineral oils or fats, most preferably oils and fats having a melting point of from 40° C. to 90° C., e.g., solid fats, such as hydrogenated hardened oil, beeswax, Japan wax, or paraffin, from the point of view of practical operation.

When only the fat is used, stronger capsules to heat can be obtained, but strong capsules are desired in some cases. In this case, the oil can be advantageously used with that fat to control the strength of capsules. As there is a possibility that the capsules will stick to each other during storage when the amount of the oil is more than two times by weight, based on the fat, the ratio thereof is desirably less than about two, the apparent melting point of the mixture being more than 40° C. The mixing ratio of the oil and fat can be easily desired so that the melting point of the mixture is higher than 40° C. The melting point of the mixture is between the melting point of oil and the melting point of the fat.

The other feature of the invention is that at least one of the oil and fat must be decomposed by an oil and fat-decomposing enzyme such as lipase, because the amino acid to encapsulated is eaten. In this sense, it is preferred that the oil and fat are natural substances.

The oils are plant oils such as castor oil, sesame oil, peanut oil, rape seed oil, tsubaki oil, tung oil or soybean oil, and animal oils such as beef tallow, lard, mutton tallow, whale oil, sardine oil or seal oil. These oils are liquid, but when they are hydrogenated by conventional method, they are converted in the form of solid. In this invention, such the hydrogneated oils belong to the fat. They are advantageously employed as the fat in the invention.

Although all the amino acids which are twenty compounds listed below are water soluble capsules having a high amino acid content of about 20 to about 70% can be obtained in accordance with the method of the present invention in which water is employed as medium. Moreover, dissolution of the amino acid contained in the inside of the capsules into the water is hardly observed. This is made possibly by the use of oils and fats having a higher melting point of 40° C. or higher and, if necessary, in combination with oils and fats having lower melting point than 40° C.

In the case of encapsulating methionine by the use of fat, e.g., hardened beef tallow having a melting point of 60° C., it is practically impossible to produce capsules containing more than 20% of methionine due to the amount of dissolution of methionine into water, whereas when hardened beef tallow having a melting point of 60° C. is employed in combination with lower melting point oils and fats, e.g., lard as an encapsulating material therefor, it is found that a capsule containing more than 50% of methionine is easily obtained.

The amino acids of the invention are glycine, alanine, valine, leucine, isoleucine, phenylalanine, tyrosine, proline, hydroxyproline, serine, threonine, cysteine, cystine, methionine, tryptophane, aspartic acid glutamic acid, arginine, lysine, and histidine, in which valine, leucine, isoleucine, threonine, methionene, lysine, phenylalanine and tryptophane are indispensable (essential) amino acids.

Amino acids which can be encapsulated may be indispensable amino acids, their olygopeptides having ten or less component amino acids, such as reduction type glutation and decomposed proteins such as polypeptide having more than ten component amino acids. The granular size of the amino acids is preferably less than 500 microns. A powdered material, such as kaolin, silica, barium sulfate, clay, starch etc. may be added as an extending agent to the encapsulating material, if desired.

The molten dispersion comprising the amino acid and the oils and fats is poured into water through a nozzle, preferably having a diameter of from 0.1 to 5 mm. for ease of encapsulation. Capsules having a granular size of 5 mm. are obtained when the molten dispersion is poured into water through a nozzle having a diameter of greater size, whereas capsules having a granular size of less than one mm. are obtained when the molten dispersion is poured into water in linear form through a nozzle having a diameter of smaller size, in which case the molten dispersion is converted into globular form at the moment of entering the water.

The temperature of water which is employed as medium serving to solidify the molten dispersion and to complete the capsule is preferably within the range of from about 20 to about 40° C. The lower the temperature of the water, the larger the tendency of producing non-uniform capsules, and the higher the temperature of the water, the larger is the tendency of dissolution of the amino acid in the water. The temperature is initially at 20–40° C. and it is not maintained at the temperature throughout the entire encapsulation. Of course, surfactant, protective colloids, lower aliphatic alcohols or a glycol may be added to the water. In the invention, capsules are different from conventional ones having clear walls. That is, capsules of the invention are composed of amino acid embedded in the fat. Therefore, the thickness of the wall is not generally decided.

Capsules containing 40% methionine produced in accordance with the present invention can be given to cattle, as a result of which it is found that they are remarkably effective in cattle breeding and milk production. In the case of giving uncapsulated methionine to cattle, efficacy is found even if large amounts are given to the cattle, this is due to the decomposition of the methionine in the paunch of the cattle. Accordingly, methionine capsules produced in accordance with the method of the present invention have large practical importance in enriching of fodder.

The methionine capsules can be produced at a lower cost than by conventional processes, in view of its simple production process and economical advantage.

The capsules which are produced in accordance with the method of the present invention have no uncovered amino acid at their outer surface and exhibit excellent water-repelling and glossy characteristics due to the fact that they are completely covered with oils and fats. The capsules can be dipped out of the water and dried, after which the capsules are packaged in their original state or in admixture with a small amount of a powdered material.

The present invention is illustrated by the accompanying drawing, wherein FIG. 1 is a sectional view of a capsule containing an amino acid, represented by core (1), where the amino acid is protectively covered with an encapsulating material (2) comprising oils and fats having a lower and a higher melting point, FIG. 2 is a graph which represents the variation in the amount of methionine released in the capsules into water when the methionine capsules produced in accordance with the method of the present invention are added to a great amount of warm water.

For a more complete understanding of the present invention, following examples are given, but these examples are not to be taken as limitative of the invention.

EXAMPLE 1

35 grams of powdered DL-methionine is mixed with 30 grams of hardened beef tallow and 30 grams of soybean oil, and the mixture heated to 64° C. to render it molten, 5 grams of kaolin is then added thereto and dispersed thoroughly therein. The molten dispersion thus prepared is poured into two liters of a 0.015% aqueous saponin solution kept at a temperature of 35° C. with slow agitation through a nozzle having a diameter of one mm. to give 95 grams of globular capsules of a diameter within a range of from 1.5 to 3.5 mm.

One gram of the capsules thus obtained was then dispersed in 300 ml. of distilled water maintained at a temperature of 40° C., and the dispersion agitated in order to examine the variation in the release of the contents, methionine, into the water with lapse of time. As shown in FIG. 2, amount of methionine released was 1% after one hour and 2% after two hours, based on the total amount of methionine. Contrary to this, in the case of powdered methionine which was not encapsulated, the powdered methionine was completely dissolved and released into water within the course of a few minutes. This proves that the protecting effect of the capsules of the present invention is highly effective.

EXAMPLE 2

40 grams of finely powdered DL-methionine was mixed with 30 grams of hardened beef tallow having a melting point of 63° C. and 30 grams of beef tallow, after which the mixture was heated to 65° C. to give a molten dispersion. The molten dispersion thus obtained was then poured into 700 ml. of a 1:1 water-methanol solution maintained at 35° C. with slow agitation through a nozzle having an inner diameter of 0.8 mm. to give 95 grams of capsules having a granular size of from 1 to 2.5 mm. The methionine content in the capsules was 39% on a quantitative analysis.

EXAMPLE 3

15 grams of powdered L-methionine, 5 grams of nicotinic acid, 20 grams of beeswax having a melting point of 63° C. and 10 grams of dibutylphthalate are mixed together, after which the mixture is heated at the temperature of 70° C. to give a molten dispersion. The molten dispersion thus obtained was then poured into 500 ml. of a 1% aqueous gelatin solution kept at a temperature of 40° C. (with slow agitation) through a nozzle having an inner diameter of 2.0 mm. to give 46 grams of capsules having a granular size of from 3 to 5 mm.

EXAMPLE 4

20 grams of finely powdered L-isoleucine was mixed with 15 grams of hardened tallow and 15 grams of soybean oil, after which the mixture thus obtained was heated to 65° C. to give a molten dispersion. This molten dispersion was then poured into 500 ml. of a 2% aqueous gelatin solution kept at 35° C. under slow agitation through a nozzle having an inner diameter of one mm. to give 47 grams of capsules having a granular size of from 2 to 4 mm.

What is claimed is:

1. A method of producing oil and fat encapsulated materials containing an amino acid consisting essentially of dispersing an amino acid in a molten mixture of oil and fat having a melting point of greater than 40° C. and oil and fat having melting point of less than 40° C., and pouring the dispersion into water at 20–40° C.

2. The method as claimed in claim 1 wherein said fat is a hydrogenated oil.

3. The method as claimed in claim 1 wherein said fat has a melting point of 40–90° C.

4. The method as claimed in claim 1 wherein said oil is an animal oil or a plant oil.

5. The method as claimed in claim 2 wherein said oil is a hydrogenated animal oil or a hydrogenated plant oil.

References Cited

UNITED STATES PATENTS

| | | | |
|---|---|---|---|
| 2,875,130 | 2/1959 | Grass, Jr. et al. | 424—38 X |
| 3,541,204 | 11/1970 | Sibbald et al. | 424—38 |
| 3,167,602 | 1/1965 | Bentov et al. | 117—100 A X |
| 3,265,629 | 8/1966 | Jensen | 252—316 |

FOREIGN PATENTS

| | | | |
|---|---|---|---|
| 1,008,044 | 10/1965 | Great Britain | 252—316 |

RICHARD D. LOVERING, Primary Examiner

U.S. Cl. X.R.

99—2 G, 2 N, 2 ND; 117—100 A; 424—38